(12) United States Patent
Youssef et al.

(10) Patent No.: US 8,007,014 B2
(45) Date of Patent: Aug. 30, 2011

(54) AXIALLY-TENSIONED PIPE JOINT

(75) Inventors: Younes Youssef, Montreal (CA); Pierre-Alexandre Hamel, Ste-Marie de Beauce (CA)

(73) Assignees: Younes Youssef, Montreal, Quebec (CA); Pierre-Alexandre Hamel, Ste-Marie de Beauce, Quebec (CA)

( * ) Notice: Subject to any disclaimer, the term of this patent is extended or adjusted under 35 U.S.C. 154(b) by 310 days.

(21) Appl. No.: 12/230,444

(22) Filed: Aug. 28, 2008

(65) Prior Publication Data

US 2010/0045029 A1    Feb. 25, 2010

(30) Foreign Application Priority Data

Aug. 22, 2008   (CA) ..................................... 2639059

(51) Int. Cl.
*F16L 37/24* (2006.01)

(52) U.S. Cl. ..................... 285/404; 29/525.09

(58) Field of Classification Search .................. 285/404, 285/403, 374; 29/282, 525.01, 525.09
See application file for complete search history.

(56) References Cited

U.S. PATENT DOCUMENTS

| | | | |
|---|---|---|---|
| 23,811 A | 4/1859 | Quinn | |
| 25,283 A | 8/1859 | Smith | |
| 51,910 A | 1/1866 | Barbarous | |
| RE3,459 E | 5/1869 | Isbell | |
| 227,412 A | 5/1880 | Camp | |
| 1,186,376 A | 6/1916 | Chapman | |
| 1,446,789 A | 2/1923 | Dodd | |
| 2,465,708 A | 3/1949 | Chapin | |
| 2,642,312 A | 6/1953 | Shine | |
| 2,819,115 A | 10/1954 | Arnold | |
| 3,103,887 A * | 9/1963 | Nepple | 285/404 |
| 3,498,645 A | 3/1970 | Kowalewski | |
| 3,781,040 A | 12/1973 | Lasko | |
| 3,885,818 A * | 5/1975 | Ammann | 285/404 |
| 3,913,954 A * | 10/1975 | Klimpl | 285/403 |
| 4,348,956 A | 9/1982 | Schmidlin | |
| 4,363,505 A * | 12/1982 | Smith | 285/404 |
| 4,576,403 A * | 3/1986 | Burkholder | 285/404 |
| 4,813,281 A * | 3/1989 | Daghe | 285/404 |
| 4,830,408 A | 5/1989 | Reimert | |
| 4,907,828 A | 3/1990 | Chang | |
| 4,957,314 A | 9/1990 | Basile | |
| 5,168,943 A | 12/1992 | Falgout, Sr. | |
| 5,431,455 A | 7/1995 | Seely | |
| 6,199,914 B1 | 3/2001 | Duhn | |
| 6,447,028 B1 | 9/2002 | LaMarca | |

(Continued)

FOREIGN PATENT DOCUMENTS

CH    672 361    11/1989
(Continued)

*Primary Examiner* — David E Bochna

(57) ABSTRACT

An axially tensioned pipe joint for joining two pipes is disclosed. The pipe joint comprises a first PVC pipe having an outer surface. The pipe joint also comprises a second PVC pipe having a bell end which fits onto the spigot end. The bell end has a plurality of angularly-spaced-apart holes extending radially through the bell end. A set of radial fasteners can be inserted into the holes so as to engage the outer surface of the spigot end to prevent relative axial movement of the first pipe with respect to the second pipe. The radial fasteners have a surface containing a hard material which is harder than the material of the second pipe and roughen the holes during insertion thereby creating a friction fit resisting removal of the radial fasteners. The pipe joint can be used for horizontal direction drilling.

19 Claims, 7 Drawing Sheets

U.S. PATENT DOCUMENTS

| | | | |
|---|---|---|---|
| 6,918,618 B2 * | 7/2005 | Allouche | 285/404 |
| 7,341,285 B2 * | 3/2008 | McPherson | 285/403 |
| 7,681,929 B1 * | 3/2010 | Schlicht | 285/404 |
| 7,735,875 B2 * | 6/2010 | Jimenez | 285/404 |
| 2002/0070545 A1 | 6/2002 | Meek | |
| 2003/0047946 A1 | 3/2003 | Ohanesian | |
| 2006/0273588 A1 | 12/2006 | Scartozzi | |

FOREIGN PATENT DOCUMENTS

| | | |
|---|---|---|
| JP | 06229492 | 8/1994 |

* cited by examiner

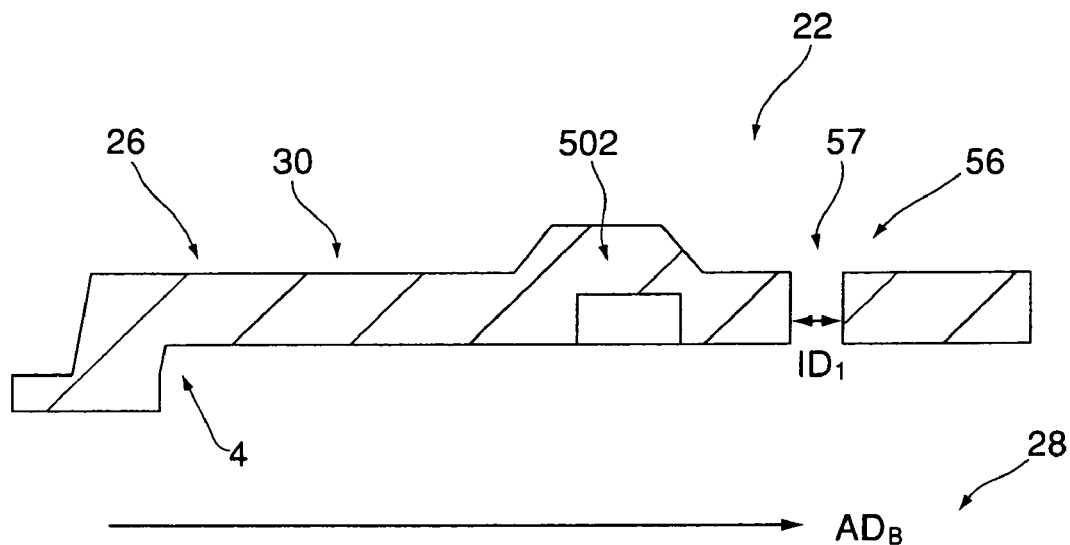
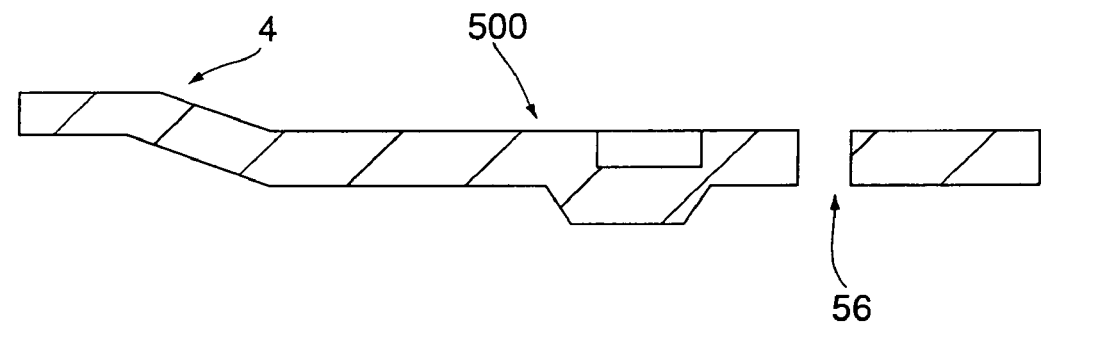
Fig.2

AXIALLY-TENSIONED PIPE JOINT

FIELD OF THE INVENTION

This invention relates to pipe joints. In particular, the present invention relates to axially-tensioned joints that can be used in harsh environments.

BACKGROUND OF THE INVENTION

Horizontal directional drilling is a method of installing underground pipelines. The drill head has the ability to turn and follow a curved path, thus allowing a horizontal bore to be made. The drill head continues in a straight path until it is turned upwards to the surface at a desired point. A pipeline is then pulled into and through the bore made by the drill head. This method of installing underground pipelines has become very popular because it has the advantage of not requiring an open-cut trench to be dug.

However, one major difficulty with horizontal directional drilling arises when installing the pipeline. As the pipeline is pulled into and through the bore, regular PVC pipes, which are connected by gasketed, push-on joints, tend to become separated due to axial forces which result from the pipeline being pulled through the bore.

The standard solution for preventing PVC pipes from becoming separated has been to use high density polyethylene or steel joints that are fusion welded together. However, welding is not a preferred process as the labour involved is relatively expensive. Furthermore, fusion welded joints are difficult to replace.

A further disadvantage of welding is that, in harsh environments, such as harsh soil conditions, steel joints, and other forms of metal, can corrode over time. This is further aggravated in northern climates where a large amount of salt and other corrosive substances are used during the winter season to melt ice and snow to facilitate driving and walking. Therefore, there is a need in the art for joints that are usable in harsh environments, and/or when exposed to salt or other corrosive substances.

Furthermore, to decrease the cost of manufacture, it is preferred to have few or no metal parts. This is the case at least because metal is relatively more expensive to manufacture.

Furthermore, many prior art joints can be complex, requiring welding and/or other forms of complicated connection procedures. These increase the labour involved, which also increases the expense during installation. The more complicated joints also increase the time required for installation, which can increase the overall cost of installation, as well as, the inconvenience to other trades on the same site.

Furthermore, it is desirable to have pipe joints that can be axially tensioned to permit them to be pulled and pushed through the bore made by horizontal directional drilling methods. Therefore, it is necessary that the pipe joint can facilitate axial tensioning and, in some cases, is not adversely affected if there is rotational movement of one pipe with respect to the other pipe.

Some solutions proposed in the past include bell and spigot type joints wherein the spigot end of one pipe is inserted into the bell end of a second pipe and corresponding features on the bell and spigot ends interact to prevent the two pipes from separating. For example, U.S. Pat. No. 3,701,548 (McGuire) discloses a system for joining plastic pipes using a bell and spigot type joint. The bell portion of a first pipe end has a plurality of longitudinal passages circumferentially spaced therearound. A circumferential passage extends from one side of each longitudinal passage on the bell portion. The spigot portion of a second pipe end includes a plurality of lugs circumferentially spaced around and extending radially outward, which lugs are received in the longitudinal passages of the bell portion. The circumferential passages are positioned and shaped to draw a mating end of the spigot portion into a firm seating engagement with a seat within the bell portion upon relative rotation of the bell and spigot portions to move the lugs along the respective circumferential passages.

U.S. Pat. No. 3,813,115 (French) teaches a bell and spigot type joint for plastic pipes. The spigot end includes a continuous helical rib integrally formed with and protruding out from its external surface. The bell end includes a continuous helical groove formed integrally around its internal surface. The helical groove of the bell end receives the helical rib of the spigot end in a threaded fashion.

U.S. Pat. No. 5,662,360 (Guzowski) discloses an interlocking restraint plastic pipe joining system which includes pairs of female and male integral end connections. The female end connection has at least one depression within a mouth opening thereof. The male end connection has at least one protrusion formed on an exterior surface thereof which is adapted to matingly engage, in a snap fit fashion, the depression in the mouth opening of the female member.

Other solutions also include bell and spigot type joints which utilize bolts as fastening mechanisms. For example, U.S. Pat. No. 4,296,953 (Nago et al.) teaches a pipe joint for preventing a spigot from slipping off from a socket. The spigot and socket are provided with engaging members which are engageable with each other axially thereof. In one embodiment, headed bolts are inserted into the socket from outside through a hole in the socket wall and screwed into a threaded bore.

U.S. Pat. No. 4,318,639 (Schosek) discloses a plastic pipe connector fitting. In addition to using a threaded joint, Schosek discloses the use of lock bolts which are threaded through radially aligned threaded holes in the pipe sleeves. The inner end of each lock bolt is provided with a peripheral cutting edge and therefore, the ends of the plastic pipe need be pre-drilled.

U.S. Pat. No. 6,918,818 B2 (Allouche) discloses a bell and spigot type joint which can be very useful in several environments. However, this bell and spigot type joint has a metal ring on both the spigot end and the bell end which, while useful in some environments, can cause difficulties in harsher environments. Furthermore, the pins are metallic and interact with the metal rings.

SUMMARY OF THE INVENTION

Accordingly, it is an object of this invention to at least partially overcome some of the disadvantages of the prior art. Also, it is an object of this invention to provide an improved pipe joint that can survive well in harsh soil conditions and yet provides a simple pipe joint that can be relatively easily and quickly used in the field.

Accordingly, in one of its aspects, this invention resides in a pipe joint comprising: a first pipe extending in a first axial direction and having a first axial opening at a spigot end, wherein the spigot end has an outer surface; a second pipe extending in a second axial direction and having a second axial opening at a bell end, wherein the bell end of the second pipe is fitted onto the spigot end of the first pipe, such that the first axial direction is substantially aligned with the second axial direction and the first axial opening communicates with the second axial opening; a plurality of angularly-spaced-apart holes extending substantially radially in the bell end of the second pipe; a set of radial fasteners for extending through said plurality of angular-spaced-apart holes, each given one of the radial fasteners having a surface containing a hard material which is harder than the material of the holes of the second pipe, and, has a first end for engaging the outer surface of the spigot end; wherein when the bell end of the second pipe is fitted onto the spigot end of the first pipe, each given one of the set of radial fasteners may be inserted into one of the plurality of angularly-spaced-apart holes until the first end engages the outer surface of the spigot end to prevent relative axial movement of the first pipe with respect to the second pipe at least in the second axial direction; and wherein, when the radial fasteners are inserted into the angular-spaced-apart holes, the hard material interacts with the angular-spaced-apart hole into which the radial fastener is inserted to roughen the hole thereby creating a friction fit resisting removal of the radial fastener.

In a further aspect, the present invention provides a non-metallic axially tensioned PVC pipe joint comprising: a first PVC pipe extending in a first axial direction and having a first axial opening at a spigot end, wherein the spigot end has a groove on an outer surface thereof; a second PVC pipe extending in a second axial direction and having a second axial opening at a bell end, wherein the bell end of the second pipe is fitted onto the spigot end of the first pipe such that the first axial direction is substantially aligned with the second axial direction, and, the first axial opening communicates with the second axial opening; a plurality of angularly-spaced-apart holes extending substantially radially in the bell end of the second pipe and axially aligned with the groove of the spigot end when the bell end is fitted onto the spigot end; a set of radial fasteners for extending through said plurality of angular-spaced-apart holes, each given one of the radial fasteners comprising non-metallic pins having a substantially cylindrical surface and a first end, at least a portion of said substantially cylindrical surface being coated with a hard material which is harder than the second PVC pipe; wherein, when the bell end of the second pipe is fitted onto the spigot end of the first pipe, the plurality of angular-spaced-apart holes align with the groove on the outer surface of the spigot end such that each given one of the set of radial fasteners may be inserted into one of the plurality of angularly-spaced-apart holes until the first end engages the groove to prevent relative axial movement of the first pipe with respect to the second pipe; and wherein, during insertion of each of the radial fasteners into the one of the plurality of angularly-spaced-apart holes, the hard material coating on the at least a portion of the substantially cylindrical surface interacts with the angular-spaced-apart holes into which the radial fastener has been inserted to roughen the hole thereby creating a friction fit resisting removal of the radial fastener from the hole.

In a still further aspect, the present invention provides the method of joining a first PVC pipe extending in a first axial direction and having a first actual opening at a spigot end, the spigot end having an outer surface to a second PVC pipe extending in a second axial direction and having a second axial opening at a bell end, wherein the bell end of the second pipe is fitted onto the spigot end of the first pipe, a method comprising: (a) providing a plurality of angularly-spaced-apart holes extending substantially radially in the bell end of the second pipe; (b) when the bell end is fitted onto the spigot end, inserting a radial fastener into each one of the plurality of angularly-spaced-apart holes, each of said radial fasteners having a first end which engages the outer surface of the spigot end to prevent relative axial movement of the first pipe with respect to the second pipe when the radial fasteners are fully inserted into the plurality of angularly-spaced-apart holes; and (c) providing a coating of a hard material, having a hardness greater than the second PVC pipe, on at least a portion of each of the radial fasteners, such that when each of the radial fasteners is inserted into one of the plurality of angularly-spaced-apart holes, the hard material coating interacts with the hole into which the radial fastener has been inserted to roughen the hole thereby creating a friction fit resisting removal of the radial fastener from the hole.

Accordingly, one of the advantages of at least some of the embodiments of the present invention relate to having radial fasteners which, in a preferred embodiment, comprise pins, having a material coating on a surface thereof which material is harder than the pipe and can interact with holes in the bell to resist removal. The radial fasteners may also have a textured surface to further resist removal. The radial fasteners also engage the outer surface of the spigot end thereby preventing relative axial movement of the first pipe from the second pipe. Clearly, use of pins can improve the overall efficiency of the pipe joint because the pins can be simply inserted in the holes, such as by hammering into the holes, once the bell end is fitted onto the spigot end.

Furthermore, another advantage of at least some embodiments of the present invention is that all of the components are non-metallic. For instance, the pipes can be polyvinyl chloride (PVC) pipes and the radial fasteners in a preferred embodiment are made from a non-metallic material, such as glass fiber in a synthetic resin matrix.

Furthermore, the radial fasteners could be made of carbon fiber, aramid, or a hybrid comprising carbon fiber, aramid or fiberglass. In other embodiments, the radial fasteners could be made from reinforced plastic or continuous protruded fibers. In all of these cases, the radial fasteners would be preferably non-metallic and therefore non-corrosive. In addition to potentially decreasing the cost of manufacture, another benefit of having a completely non-metallic pipe joint and pipe is to avoid concerns arising from harsh environments and harsh soils, as compared with when pipe joints comprising metal are used.

In a further preferred embodiment, the radial fasteners are manufactured by cutting fiber reinforced polymer (FRP) bars which have a coating on the outside, such as a sand coating. The advantage of using these types of FRP bars is that the cost to purchase is relatively inexpensive and yet the rods provide excellent tensile strength, are non-metallic and therefore non-corrosive and therefore the sand coating on such bars interact with the angularly-spaced-apart holes in the bell end to improve the friction fit. It is understood that the coating on these pins is not restricted to sand, but rather could be any type of abrasive coating having a material harder than the PVC of the pipes. For instance, while in a preferred embodiment sand could be used as the hard material, other materials such as glass, ceramics and other materials that are harder than the material of the pipe, and in particular the holes in the pipe, could be used. Preferably the material is also non-metallic to have a completely non-metallic pipejoint.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention:

FIG. 2 is a cross-section view of a bell end of a second pipe according to one embodiment of the present invention.

DETAILED DESCRIPTION OF THE PREFERRED EMBODIMENTS

Preferred embodiments of the invention and its advantages can be understood by referring to the present drawings. In the present drawings, like numerals are used for like and corresponding parts of the accompanying drawings.

Figure 4:
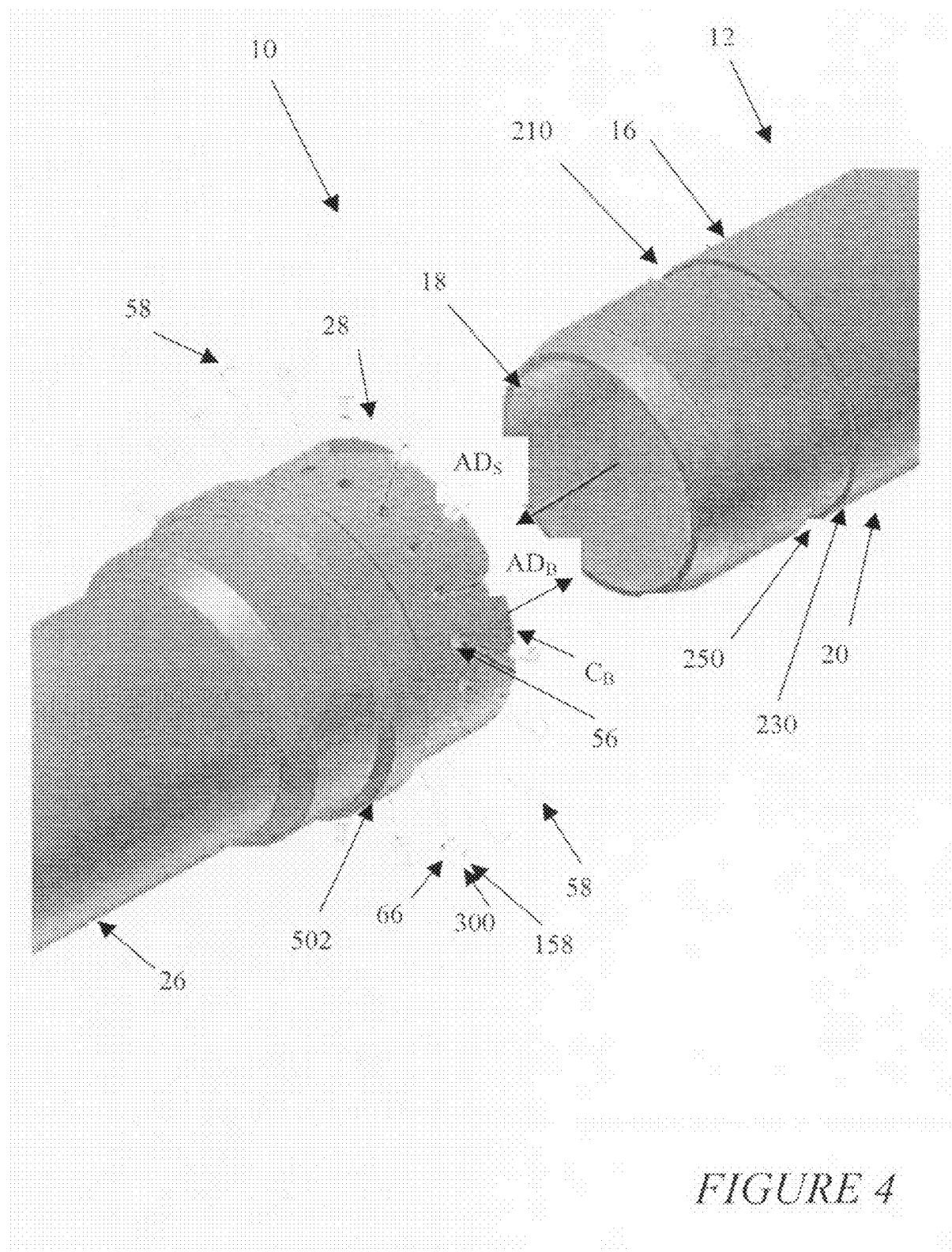
FIG. 4 is an exploded view of a pipe joint assembly according to one preferred embodiment of the present invention.
Figure 5:
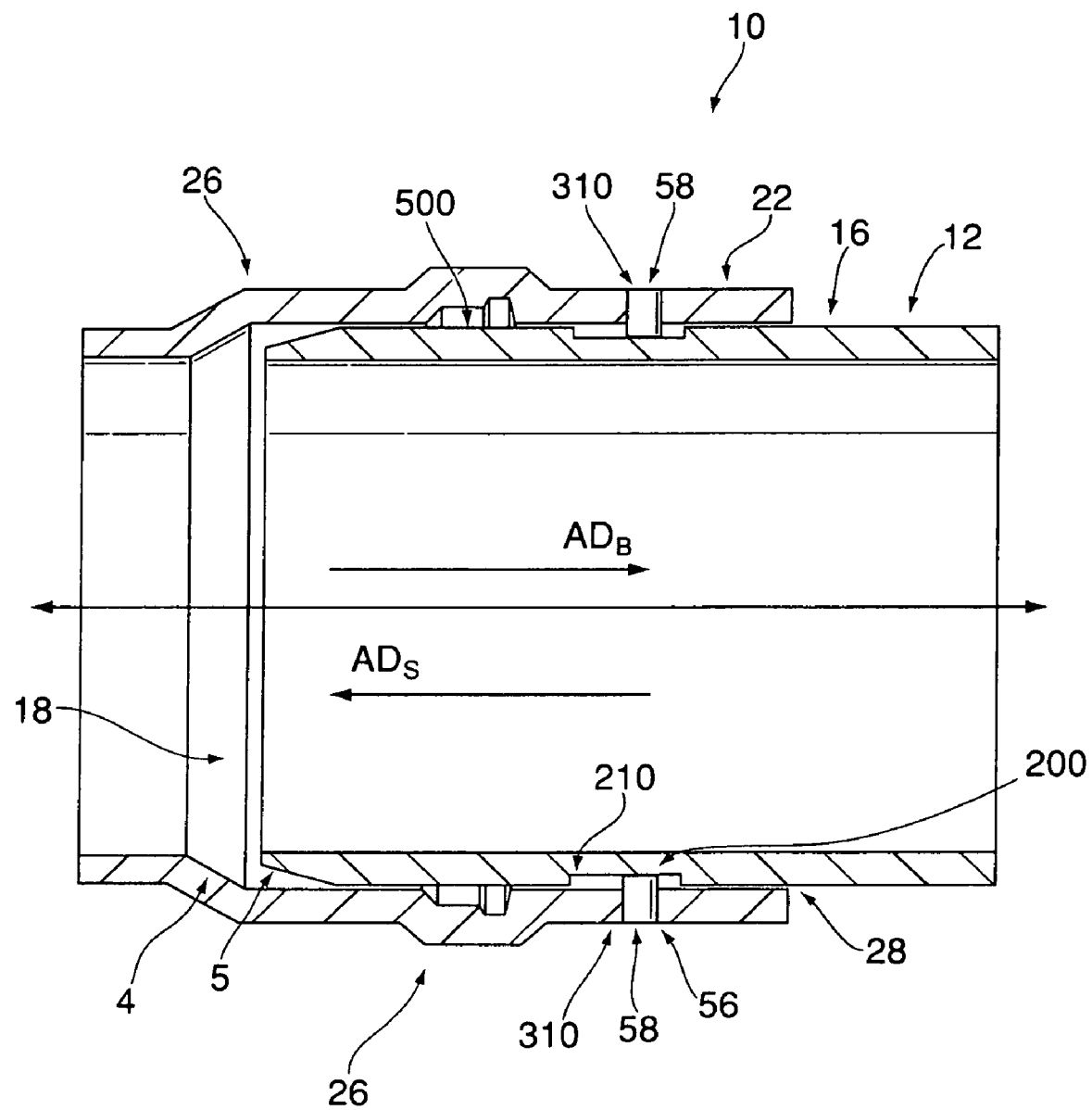
FIG. 5 is a cross-section view of the pipe joint assembly shown in FIG. 4 according to one preferred embodiment of the present invention.

As shown in FIG. 4, one embodiment of the present invention relates to a pipe joint, shown generally by reference numeral 10 in FIG. 4, for joining a first pipe 12 and a second pipe 22. As illustrated in FIG. 4, the first pipe 12 extends in a first axial direction $AD_S$ and has a spigot end 16 with a first axial opening 18. The spigot end 16 also has an outer surface, shown generally by reference number 20. The second pipe 22 extends in a second axial direction $AD_B$ and has a second axial opening 28 at a bell end 26. The bell end 26 of the second pipe 22 can be fitted onto the spigot end 16 of the first pipe 12. In this way, the first axial direction $AD_S$ is substantially aligned with the second axial direction $AD_B$, and, the first axial opening 18 communicates with the second axial opening 28 when the pipes 12, 22 are to be joined, as illustrated in FIGS. 4 and 5.

As best illustrated in FIG. 4, a plurality of angular-spaced-apart holes 56 extend substantially radially in the bell end 26 of the second pipe 22. The number of the plurality of angularly-spaced-apart holes 56 and the angular distance between them and their position on the bell end 26 is generally a matter of design preference and will depend on a number of factors, including the diameters of the second pipe 22 and first pipe 12 and the size and shape of the holes 56. In a preferred embodiment, as illustrated in FIG. 4, there are generally about 24 angularly-spaced-apart holes 56 about the circumference CB of the bell end 26.

As also illustrated in FIG. 4, a set of radial fasteners, shown generally by reference numeral 58, extends through the plurality of angularly-spaced-apart holes 56. Each given one of the radial fasteners 58 preferably has a surface, shown generally by reference numeral 158 in FIG. 4, which is coated with a hard material, shown generally by reference numeral 300. Preferably, this hard material is harder than the material of the holes 56 of the second pipe 22. Each one of the radial fasteners also has a first end 66 which is illustrated in FIG. 4, as well as FIGS. 3 and 5, which is designed to engage the outer surface 20 of the spigot end 16. In a way, when the bell end 26 of the second pipe 22 is fitted on to the spigot end 16 of the first pipe, each given one of the radial fasteners 58 may be inserted into one of the plurality of angularly-spaced-apart holes 58 until the first end 66 engages the outer surface 20 of the spigot end 16 to prevent or resist relative axial movement of the first pipe 12 with respect to the second pipe 22.

When the radial fasteners 58 are inserted into the angularly-spaced-apart hole 56, the hard material 300 coated on the outer surface 158 of the fastener 56 interacts with the angularly-spaced-apart holes 56 into which the radial fastener 58 is inserted. This has the effect of roughening the hole 56 into which the radial fastener 58 is being inserted thereby creating a friction fit, shown generally by reference numeral 310 in FIG. 5, between the outer surface 158 of the fastener 58 and the inner surface 57 of the hole 58 into which the fastener 58 has been inserted, which resists removal of the radial fastener 58 from the hole 57. The radial fasteners 58 may also have a textured surface to further improve the friction fit.

Figure 1:
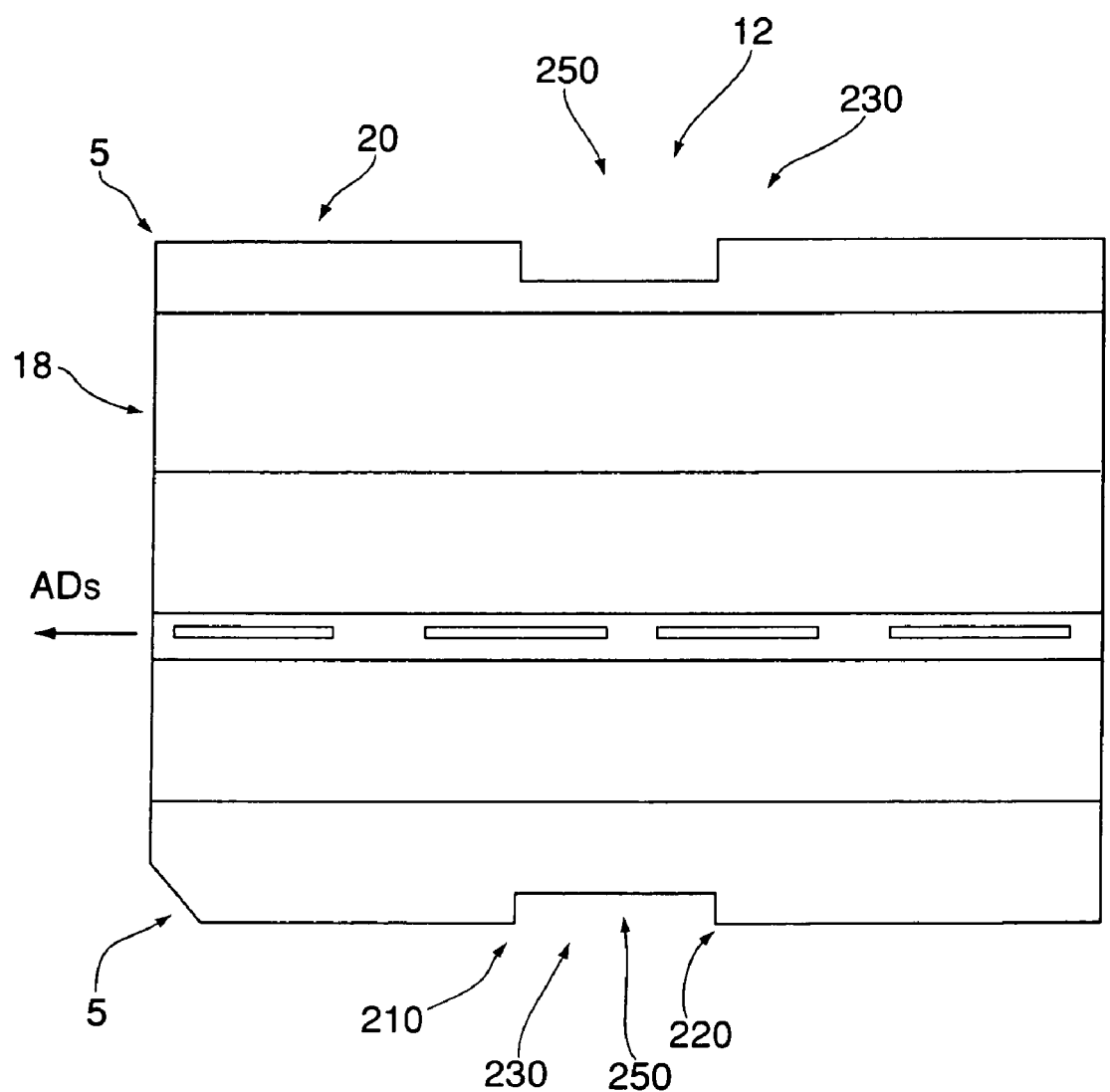
FIG. 1 is a cross-section view of a spigot end of a first pipe according to one embodiment of the present invention.

FIG. 1 illustrates a cross-section of a spigot end of the first pipe 12 according to one preferred embodiment. As illustrated in FIG. 1, the outer surface 20 preferably comprises a first edge 210. In one preferred embodiment, the first end 66 of each of the radial fasteners 58 engages the first edge 210 when the radial fasteners 56 have been inserted into the holes 58. In this way, axial movement of the first pipe 12 with respect to the second pipe 22 may be prevented thereby preventing removal of the spigot end 16 from the bell end 26.

It is understood that further insertion of the spigot end 16 into the bell end 26 may be restricted by the sloping edge 5 of the spigot end 16 interacting with the internal sloping surface 4 of the bell end 26 and illustrated in FIG. 5. In a further preferred embodiment, the outer surface 20 may comprise a groove 230 extending around the circumference CS of the spigot end 16. The groove 230 may comprise the first edge 210 as well as the second edge 220 opposite the first edge 210 to thereby define a channel 250. The channel 250 is preferably axially aligned with the plurality of angularly-spaced-apart holes 56 when the spigot end is fitted onto the bell end 26. In this way, the first end 66 of each of the radial fasteners 58 may engage the outer surface 20 of the spigot end 16 by fitting into the channel 250 of the groove 230 and engaging the first edge 210 and the second edge 220 to restrict axial movement of the spigot end 16 with respect to the bell end 26 in both the first axial direction $AD_B$ and the second axial direction $AD_S$. Further insertion of the spigot end 12 into the bell end 26 would be prevented by the first end 66 of the fastener 58 engaging the second edge 220 and/or the outer sloped surface 5 of the spigot end 16 engaging the inner sloped surface 4 of the bell end 26. Removal of the spigot end 12 from the bell end 26 would be prevented by the first end 66 of the fastener 58 engaging the first edge 210.

It is understood that the outer surface 20 of the spigot end 16 shown in FIGS. 1, 4 and 5 is a preferred embodiment of the present invention. The present invention is not restricted to the first edge 210 or to the arrangement of a groove 230 having a second edge 220 and a channel 250. In particular, it is understood that the outer surface 20 of the spigot end 16 may have other shapes, indentations, channels, undulations, holes, grooves 230 or any other types of protrusions or indentations which can permit the radial fasteners 58 to engage the outer surface 20 to prevent axial movement of the first pipe 12 with respect to the second pipe 22.

FIG. 2 illustrates a cross-section of the bell end 26 of the second pipe 22. As illustrated in FIG. 2, the bell end 26 has angularly-spaced-apart holes 56 which extend substantially radially around the bell end 26 of the second pipe 22. As illustrated in FIG. 2, there are two angularly-spaced-apart holes 56 shown because there are an even number of angular-spaced-apart holes 56 in this embodiment, but that need not necessarily be the case. Each of the holes 56 preferably have an inner surface 57 and an inner diameter $ID_1$. Preferably, the inner diameter $ID_1$ is about the same, or, marginally smaller, than the radial fastener 58 to facilitate creating the friction fit 310.

The bell end 26 also preferably has a gasket 500 to improve the seal of the first pipe 12 with respect to the second pipe 22 as illustrated in FIGS. 2 and 5. The gasket 500 is preferably located in a gasket channel 502, and, at an axial position along the first and second axial directions $AD_B$ and $AD_S$ which is intermediate the axial position of the plurality of angularly-spaced-apart holes 58 and the first axial opening 18 of the first part 12 when the bell end 26 is fitted on to the spigot end 16. This is illustrated for instance in FIG. 5 which shows the first and second axial directions $AD_B$ and $AD_S$ aligned with one another because the bell end 26 is fitted onto the spigot end 16, and, in this orientation, the gasket 500 is located axially intermediate the first axial opening 18 of the spigot end 16 and the holes 56.

As also illustrated in FIG. 5, the first and second axial direction $AD_B$, $AD_S$ are aligned along a longitudinal axis $A_L$ of the joint 10 when the bell end 26 is fitted into the spigot end 16 and the first pipe 12 is joined to the second pipe 22. In this configuration, the gasket 500 is located along the longitudinal axis $A_L$ intermediate the first opening 18 and the holes 56. In this way, the gasket 500 provides a further seal to the holes 56 and also the second opening 28 of the bell end 26 which is located axially distant from the first opening 18, the gasket 500, and the holes 56 along the longitudinal axis $A_L$.

Furthermore, in this orientation the holes 56 are substantially axially aligned with the channel 250. Furthermore, the first edge 210 is located along the longitudinal axis $A_L$ between the holes 56 and the gasket 500.

During assembly, the bell end 16 is fitted onto the spigot end 26 until the holes 56 are aligned with the channel 250. This can be determined in a number of ways, including by having markings on the outer surface 20 of the spigot end 16 indicating the axial position along the longitudinal axis AL at which the second opening 28 should be located for the holes 56 to be axially aligned with the channel 250, or at least to have the first edge 210 axially intermediate the gasket 500 and the holes 56 in the embodiment where the outer surface 250 only comprises a first edge 210. The radial fasteners 58 can then be inserted into the holes 58 to engage the outer surface 20 of the spigot end 16 to resist and more preferably prevent axial movement of the first pipe 12 at least in the second axial direction $AD_B$.

The pipe joint 10 will generally be used to join a first pipe 12, which is preferably made from PVC, to a second pipe 22, which is also preferably made from PVC. Therefore, the first material 300 on the surface 158 of the radial fasteners 58 is preferably a substance having a hardness greater than PVC in order to roughen the hole 56 when the fastener 58 is inserted into the hole. It is also understood that the inner diameter $ID_1$ of the hole 56 would be comparable, or marginally smaller, than the size of the radial fasteners 58 to also accommodate this roughening to facilitate creating the friction fit 310 resisting removal of the radial fastener 58. Furthermore, in a preferred embodiment, the radial fasteners 58 only extend a small distance, such as less than 2.5 mm from the surface of the bell end 26 when the fasteners 58 are fully inserted, into the holes 56.

Figure 3:
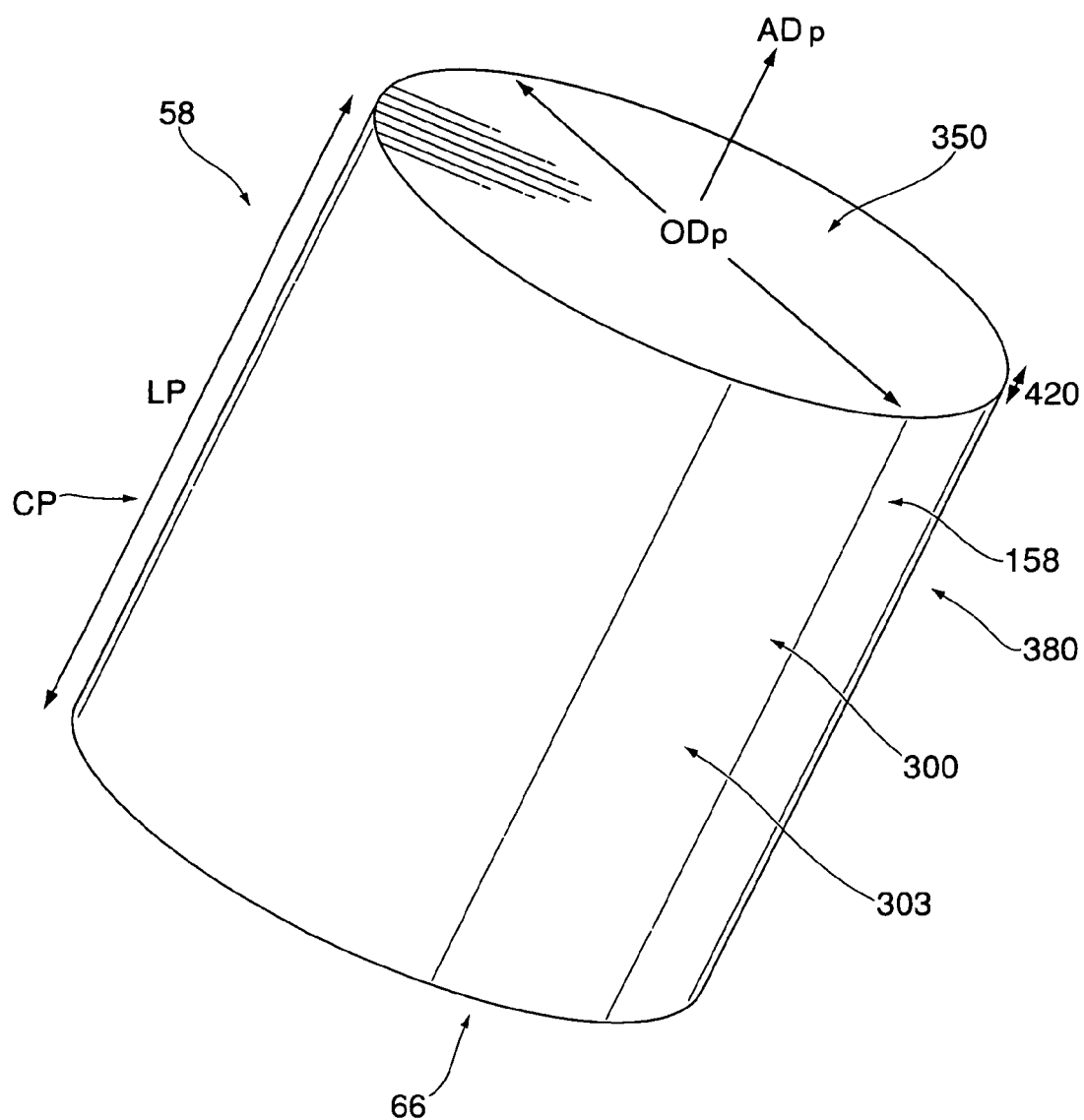
FIG. 3 is a perspective view of a radial fastener according to one preferred embodiment of the present invention.

FIG. 3 shows a preferred embodiment of the radial fastener 58. As illustrated in FIG. 3, in a preferred embodiment, the radial fastener 58 has an outer surface 158 containing the hard material 300, which is harder than the material of the holes 56 of the second pipe 22. The radial fasteners 58 may be coated the hard material 300, or the radial fasteners 58 may be formed with a resin comprising the hard material 300. In either case, the hard material 300 is exposed on the outer surface 158 of the fastener 58 to roughen the hole 57 during insertion. The radial fasteners 58 also comprise the first end 66 which engages the outer surface of the spigot end 16 in order to prevent axial movement of the first pipe 12 with respect to the second pipe 22. In a preferred embodiment, as illustrated in FIGS. 3, 4 and 5, the radial fasteners 56 comprise a pin, shown generally by reference numeral 380, extending along a third axis $AD_P$ from the first end 66 and having a substantially cylindrical surface CP about the third axis $AD_P$. The hard material 300 is then embedded on the cylindrical surface CP of the pin 380 so as to interact with the inner surface 57 of the angularly-spaced-apart holes 56 into which the pin 380 is inserted. The cylindrical surface CP of the pin 380 may also be textured.

Figure 7A:
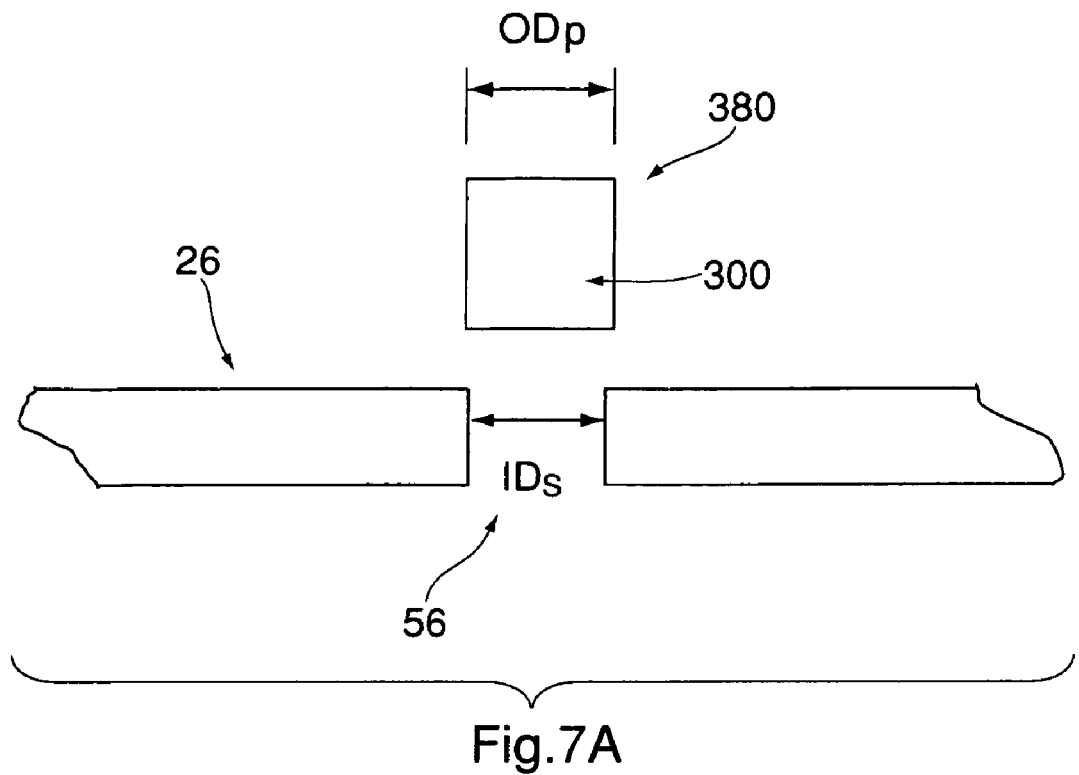
FIG. 7A shows a detailed view of a pin being inserted into an angular-spaced-apart hole according to one embodiment where the outer diameter of the pin is substantially the same size as the inner diameter of the hole.
Figure 7B:
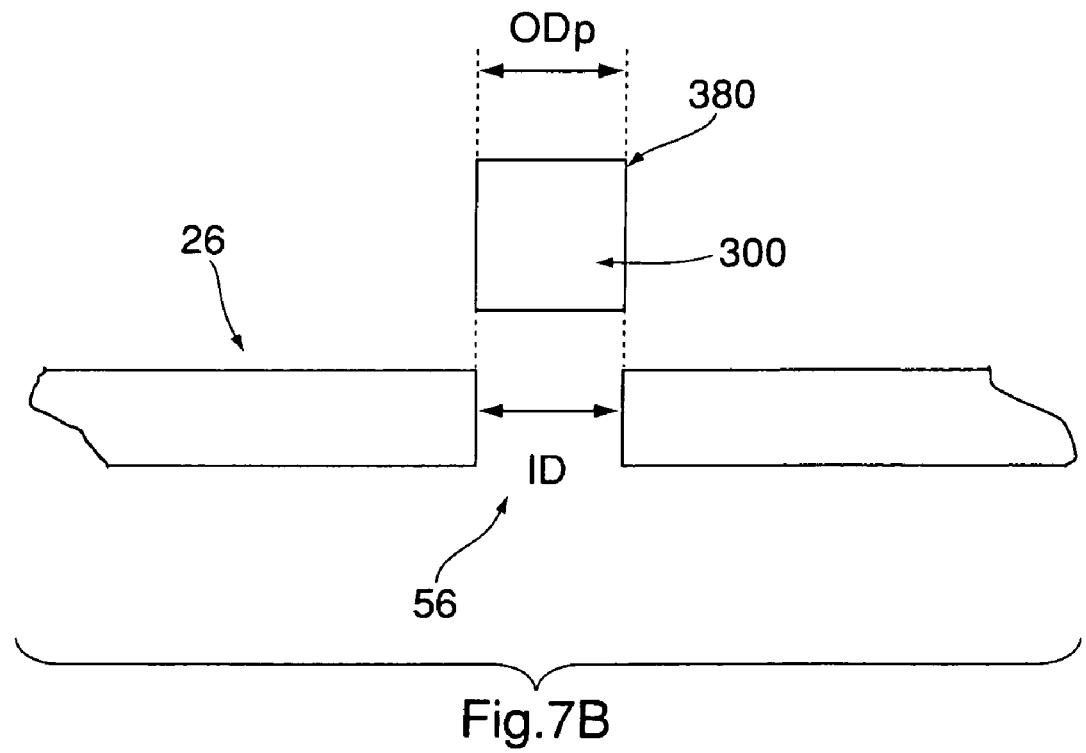
FIG. 7B shows detailed view of a pin being inserted into an angular-spaced-apart hole according to one embodiment where the outer diameter of the pin is marginally smaller than the inner diameter of the hole.

Preferably, the pin 380 will have an outer diameter $OD_P$ which is substantially the same as, or marginally smaller than, the inner diameter $ID_1$ of the hole 56. For instance, FIG. 7A shows an embodiment where the pin 380 has a outer diameter $OD_P$ which is substantially the same as the inner diameter $ID_1$ of the hole 56. This facilitates the hard material 300 on the pin 380 interacting with the inner surface 57 of the hole 56 to create the friction fit 310. FIG. 7B shows an alternate preferred embodiment where the outer diameter $OD_P$ of the pin 380 is marginally larger than the inner diameter $ID_1$ of the hole 56 to further facilitate creating the friction fit 310. In the embodiment shown in FIG. 7B, for example, the pin 380 outer diameter $OD_P$ may be 0.770+/−0.005 in and the inner diameter $ID_1$ of the hole 58 may be 0.75+/−0.005 in. Other dimensions may be possible as will be apparent to persons skilled in the art and depending on specific design criteria.

As stated above, in the preferred embodiment where the second pipe 22 is made from polyvinyl chloride (PVC) and the inner surface 57 of the holes 56 are exposed PVC, the first material 300 of the radial fasteners 58 comprises a substance 303 having a hardness greater than PVC. In a further preferred embodiment, the first material 300 is selected from the group consisting of sand, glass and ceramics. It will be understood that, in general, the same length of pipe 12, 22 will have a bell end 26 at one end and the spigot end 16 at the other end and the joint 10 will be used to join together first and second pipes 12, 22 which are substantially identical. Therefore, in this case, both the first pipe 12 and the second pipe 22 will be made from PVC.

In one preferred embodiment, each one of the radial fasteners 58 is made of a material 350 selected from the group consisting of fibreglass, carbon fibre, aramid, a hybrid of glass fibre, carbon fibre and aramid, reinforced plastic and continuous protruded rubber. It is understood that with the radial fasteners made from these type of materials, and the hard material 300 selected from the group consisting of sand, glass and ceramics, and given that the first pipe 12 and second pipe 22 would be made from PVC the entire joint 10 will be non-metallic. In a further preferred embodiment, the radial fasteners 58 may be made from a material 350 consisting of fibreglass embedded in a matrix of synthetic resin, and, the hard material 300 is sand also constituting a joint 10 which is entirely non-metallic. Having a completely non-metallic joint 10 avoids any concerns arising from harsh environments or harsh soils.

Figure 6:
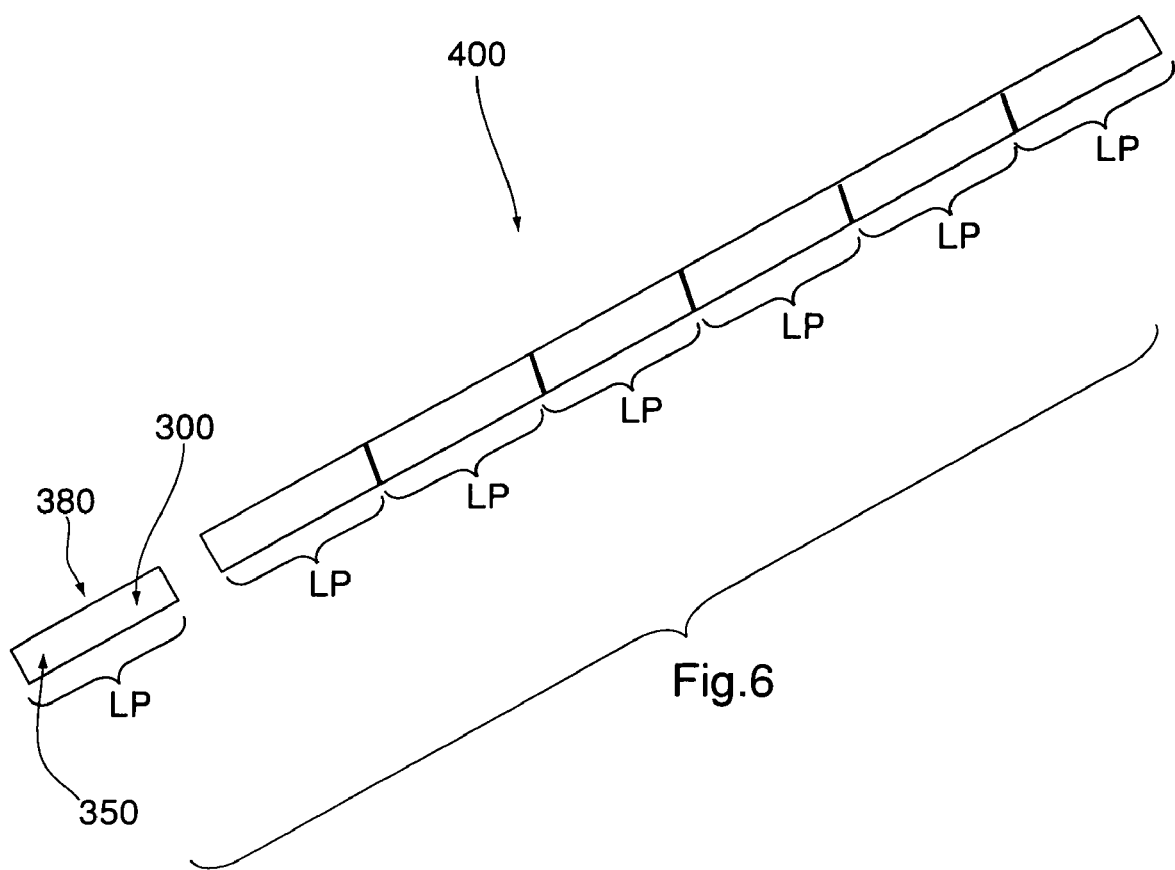
FIG. 6 is a length of fibre reinforced polymer bar being cut to form pins according to one preferred embodiment of the invention.

Furthermore, in the preferred embodiment where the radial fasteners 58 are pins 380, it is preferred to have the pins 380 made from a single length of fibreglass embedded in a matrix of synthetic resin. In this further preferred embodiment, the pins 380 are created by cutting a fibre reinforced polymer bar 200, shown generally by reference numeral 400 in FIG. 6, cut at successive lengths corresponding to the first length LP of the pins 380. The pins 380 will then be used as the radial fasteners 58. Preferably, the length LP is selected such that the portion 420 of the pin 380 extending beyond an outer surface 30 of the bell end 26 is less than 5 mm and more preferably less than 2.5 mm as illustrated in FIG. 3. The pins 380 may also be flush with the bell end 26 when fully inserted into the holes 56. The pin 380 may be inserted into the holes 57 simply by external mechanical force.

In a preferred embodiment, the joint 10 is used in horizontal direction drilling (HDD). It has been appreciated by the applicant that use of the radial fasteners 58 inserted into the angularly-spaced-apart holes 56 so as to engage the outer surface 20 of the spigot end 16 and prevent relative axial movement of the first pipe 12 with respect to the second pipe 22 is sufficient for use of the joint in HDD. Furthermore, as indicated above, in the preferred embodiment where the materials are all non-metallic, the resulting joint 10 will not corrode in harsh environment thereby avoiding concerns arising from harsh environments and harsh soils, as compared with pipe joints comprising metal are used.

It is understood that the holes 56 could have different shapes and need not be necessarily circular. Moreover, the holes 56 need not be the same shape in each embodiment. Rather, provided the holes 56 have a shape which corresponds to the shape of the radial fasteners 58 into which each given one of the radial fasteners 58 is inserted into one of the plurality of angularly-spaced-apart holes 56 until the first end 66 engages the outer surface 20 of the spigot end 16 and the hard material 300 on the radial fasteners interacts with the angular-spaced-apart holes 56 to roughen the holes 56 thereby creating a friction fit 310 resisting removal of the radial fasteners 58, the holes 56 and the radial fasteners 58 may have any shape.

It is also understood that by this arrangement, the joint 10 will prevent relative axial movement of the first pipe 12 with respect to the second pipe 22 at least in the second axial direction. In the cases where the outer surface of the groove 230 or a second edge 220 and/or a channel 250, relative axial movement of the first pipe with respect to the second pipe will prevent relative axial movement in the second axial direction $AD_B$ also. It is also understood that there is no joint that is completely failure proof and, therefore, under extreme forces, relative axial movement may occur. However, under typical axial forces as may occur, for instance during use and installation, including, for example, horizontal direction drilling (HDD), the joint 10 should prevent relative axial movement of the first pipe 12 with respect to the second pipe 22 at least in the second axial direction $AD_S$.

It would also be understood that, in at least some embodiments, the joint 10 may not prevent rotational movement of the first pipe 12 with respect to the second pipe 22. This would particularly be the case where the outer surface 20 of the spigot end 16 has a groove 230 or channel 250 which is circular about the circumference CS at the spigot end. However, it has been appreciated that preventing relative rotational movement is not as critical to the pipe joint 10 and does not arise as often during normal use and installation as relative axial movement and, in particular, during HDD.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate ordinary, plain and accustomed meanings (as generally evidenced, inter alia, by dictionaries and/or technical lexicons), in the situation where a word or term used in the claims has more than one pre-established meaning and the specification is helpful in choosing between the alternatives."

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The invention claimed is:

1. A pipe joint comprising:
   a first pipe extending in a first axial direction and having a first axial opening at a spigot end, wherein the spigot end has an outer surface;
   a second pipe extending in a second axial direction and having a second axial opening at a bell end, wherein the bell end of the second pipe is fitted onto the spigot end of the first pipe, such that the first axial direction is substantially aligned with the second axial direction and the first axial opening communicates with the second axial opening;
   a plurality of angularly-spaced-apart holes extending substantially radially in the bell end of the second pipe;
   a set of radial fasteners for extending through said plurality of angular-spaced-apart holes, each given one of the radial fasteners having a surface containing a hard material which is harder than the material of the holes of the second pipe, and, has a first end for engaging the outer surface of the spigot end;
   wherein the second pipe is made from polyvinyl chloride (PVC) and the hard material comprises a substance having a hardness greater than PVC;
   wherein the substance is selected from the group consisting of sand, glass, and ceramics;
   wherein when the bell end of the second pipe is fitted onto the spigot end of the first pipe, each given one of the set of radial fasteners may be inserted into one of the plurality of angularly-spaced-apart holes until the first end engages the outer surface of the spigot end to prevent relative axial movement of the first pipe with respect to the second pipe at least in the second axial direction;
   wherein, when the radial fasteners are inserted into the angular-spaced-apart holes, the hard material interacts with the angular-spaced-apart hole into which the radial fastener is inserted to roughen the hole thereby creating a friction fit resisting removal of the radial fastener; and
   wherein the pipe joint is non-metallic.

2. A pipe joint as defined in claim 1 wherein the outer surface of the spigot end has a first edge; and
   wherein the first end of each of the set of radial fasteners engages the first edge to prevent axial movement of the first pipe with respect to the second pipe.

3. A pipe joint as defined in claim 2 wherein the outer surface comprises a groove extending around the circumference of the spigot end, said groove comprising the first edge and a second edge opposite the first edge defining a channel to prevent relative axial movement in the first axial direction and the second axial direction; and wherein the channel is axially aligned with the plurality of angularly-spaced-apart holes when the spigot end is fitted onto the bell end.

4. A pipe joint as defined in claim 3 wherein each of the radial fasteners engages the outer surface of the spigot end by entering the channel of the groove and abutting against the first edge.

5. A pipe joint as defined in claim 3 wherein the hard material comprises a non-metallic substance having a hardness greater than PVC.

6. A pipe joint as defined in claim 5 wherein the radial fasteners are made from fiber glass embedded in a matrix of synthetic resin, and, the hard material is sand.

7. A joint assembly as defined in claim 5 used in Horizontal Direction Drilling (HDD).

8. The pipe joint as defined in claim 1 wherein the first pipe is made from PVC.

9. A pipe joint as defined in claim 8 wherein each one of the set of radial fasteners is made of a material selected from the group consisting of fiber glass, carbon fiber, aramid, a hybrid of glass fiber, carbon fiber and aramid, reinforced plastic and continuous pultruded fiber.

10. The pipe joint as defined in claim 9 further comprising a longitudinal axis aligned with the first axial direction and the second axial direction when the bell end is fitted onto the spigot end;
a gasket located between the bell end and the spigot end and positioned intermediate the plurality of angularly-spaced-apart holes and the first axial opening of the first pipe along the longitudinal axis.

11. A pipe joint as defined in claim 1 wherein each radial fastener is a pin extending along a third axis from the first end and having a substantially cylindrical surface about the third axis; and
wherein the hard material is embedded on the cylindrical surface of the pin so as to interact with the angular-spaced-apart hole into which the pin is inserted.

12. A pipe joint as defined in claim 11 wherein the angular-spaced-apart holes have an inner diameter and the cylindrical surface of the pins has an outer diameter; and
wherein the inner diameter is substantially the same as the outer diameter.

13. A pipe joint as defined in claim 11:
wherein the angular-spaced-apart holes have an inner diameter and the cylindrical surface of the pins have an outer diameter; and
wherein the inner diameter is marginally smaller than the outer diameter.

14. A non-metallic axially tensioned PVC pipe joint comprising:
a first PVC pipe extending in a first axial direction and having a first axial opening at a spigot end, wherein the spigot end has a groove on an outer surface thereof;
a second PVC pipe extending in a second axial direction and having a second axial opening at a bell end, wherein the bell end of the second pipe is fitted onto the spigot end of the first pipe such that the first axial direction is substantially aligned with the second axial direction, and, the first axial opening communicates with the second axial opening;
a plurality of angularly-spaced-apart holes extending substantially radially in the bell end of the second pipe and axially aligned with the groove of the spigot end when the bell end is fitted onto the spigot end;
a set of radial fasteners for extending through said plurality of angular-spaced-apart holes, each given one of the radial fasteners comprising non-metallic pins having a substantially cylindrical surface and a first end, at least a portion of said substantially cylindrical surface being coated with a hard material which is harder than the second PVC pipe;
wherein, when the bell end of the second pipe is fitted onto the spigot end of the first pipe, the plurality of angular-spaced-apart holes align with the groove on the outer surface of the spigot end such that each given one of the set of radial fasteners may be inserted into one of the plurality of angularly-spaced-apart holes until the first end engages the groove to prevent relative axial movement of the first pipe with respect to the second pipe; and
wherein, during insertion of each of the radial fasteners into the one of the plurality of angularly-spaced-apart holes, the hard material coating on the at least a portion of the substantially cylindrical surface interacts with the angular-spaced-apart holes into which the radial fastener has been inserted to roughen the hole thereby creating a friction fit resisting removal of the radial fastener from the hole.

15. A non-metallic axially tensioned PVC pipe joint defined in claim 14 wherein the radial fastener is made from glass fibers embedded in a matrix of synthetic resin and the hard material coating comprises sand, such that the pipe joint is non-metallic.

16. The method of joining a first PVC pipe extending in a first axial direction and having a first actual opening at a-spigot end, the spigot end having an outer surface to a second PVC pipe extending in a second axial direction and having a second axial opening at a bell end, wherein the bell end of the second pipe is fitted onto the spigot end of the first pipe, a method comprising:
(a) providing a plurality of angularly-spaced-apart holes extending substantially radially in the bell end of the second pipe;
(b) when the bell end is fitted onto the spigot end, inserting a radial fastener into each one of the plurality of angularly-spaced-apart holes, each of said radial fasteners having a first end which engages the outer surface of the spigot end to prevent relative axial movement of the first pipe with respect to the second pipe when the radial fasteners are fully inserted into the plurality of angularly-spaced-apart holes; and
(c) providing a coating of a hard material, having a hardness greater than the second PVC pipe, on at least a portion of each of the radial fasteners, such that when each of the radial fasteners is inserted into one of the plurality of angularly-spaced-apart holes, the hard material coating interacts with the hole into which the radial fastener has been inserted to roughen the hole thereby creating a friction fit resisting removal of the radial fastener from the hole.

17. The method as defined in claim 16 further comprising:
cutting a fiber reinforced polymer bar having a hard material selected from the group consisting of sand, glass, and ceramics to form pins having a first length, said pins being used as the radial fasteners in step (b) above.

18. The method as defined in claim 17 wherein the length of each pin is selected such that after the pin is fully inserted into the angular hole and engages the outer surface of the spigot end of the first pipe, the portion of the pin extending beyond an outer surface of the bell end is less than 2.5 mm and further comprising:
using the joint in horizontal direction drilling (HDD).

19. The method as defined in claim 16 wherein the radial fasteners and the coating are non-metallic.

* * * * *